United States Patent [19]

Monte

[11] Patent Number: 5,280,934
[45] Date of Patent: Jan. 25, 1994

[54] METHOD AND APPARATUS FOR RETRACTABLE BANNISTER

[75] Inventor: Pat P. Monte, 393 Buenaventura Blvd., Kissimmee, Fla. 34743

[73] Assignees: Pat P. Monte; Emma Lou Monte, both of Kissimmee, Fla.

[21] Appl. No.: 420

[22] Filed: Jan. 4, 1993

[51] Int. Cl.$^5$ .............................................. B60R 3/02
[52] U.S. Cl. .................................. 280/166; 280/164.1; 182/96; 182/127
[58] Field of Search ................. 280/163, 164.1, 166; 52/79.6, 143, 183; 105/447, 448; 182/88, 95, 96, 127

[56] References Cited

U.S. PATENT DOCUMENTS

| | | | |
|---|---|---|---|
| 724,753 | 4/1903 | Stansbury | 105/447 |
| 764,420 | 7/1904 | Buchanan | 105/448 |
| 1,829,729 | 11/1931 | Blanton | 280/164.1 |
| 2,812,528 | 11/1957 | Odell | 14/71 |
| 3,871,479 | 3/1975 | Pelto | 182/86 |
| 3,995,832 | 12/1976 | Wiese | 256/59 |
| 4,030,255 | 6/1977 | Hartman | 52/9 |
| 4,071,260 | 1/1978 | Marshall, Sr. | 280/166 |
| 4,073,501 | 2/1978 | Grow | 280/166 X |
| 4,168,134 | 9/1979 | Pohl | 414/545 |
| 4,606,433 | 8/1986 | Smalley et al. | 280/166 X |
| 4,720,116 | 1/1988 | Williams et al. | 280/166 |
| 4,997,165 | 3/1991 | Wiese | 256/59 |
| 5,143,324 | 9/1992 | Cornelius et al. | 244/129.6 |

FOREIGN PATENT DOCUMENTS

| | | | |
|---|---|---|---|
| 356584 | 12/1905 | France | 280/166 |
| 1383843 | 12/1965 | France | 280/166 |
| 1349760 | 4/1974 | United Kingdom | 280/166 |

*Primary Examiner*—Brian L. Johnson
*Attorney, Agent, or Firm*—Reising, Ethington, Barnard, Perry & Milton

[57] ABSTRACT

A retractable bannister (10) is connected to both a side wall (16) of a recreational vehicle (12) and the bottom step (28) of a set of retractable steps (24). The retractable bannister (10) pivots and telescopes out when the set of retractable steps (24) are moved from their retracted position to their extended position. The retractable bannister (10) includes a plurality of telescoping members (32) to allow for an extension in length when the retractable steps (24) are moved to their extended position. Offset (66) spaces the bottom end (36) of the retractable bannister (10) a distance from the retractable steps (24) such that the retractable bannister (10) extends and rotates in a plane perpendicular to the horizontal plane (A) defined by the face of the bottom step (28).

9 Claims, 2 Drawing Sheets

METHOD AND APPARATUS FOR RETRACTABLE BANNISTER

BACKGROUND ART

1. Technical Field

The subject invention relates to adjustable rails. More specifically, the subject invention relates to adjustable rails secured to vehicular passenger compartments.

2. Description of Related Art

Recreational vehicles, such as motor homes, trailer homes, and the like, are a very popular way to combine travel and nightly accommodations. This mode of travel is especially popular with senior citizens. These recreational vehicles have all the comforts of home because the travelers are capable of bringing personal home wares with them.

Recreational vehicles (hereinafter "motor homes") mimic the home environment as much as possible with some obvious short-comings, due to the size restraints and mobility requirements of the motor homes. One such short-coming is the facilities used to enter and exit the side door, and in many cases, the only door of the motor home. The steps are much smaller than steps to a home and, depending on the angle the motor home is with respect to the ground below it, the bottom step may be a substantial distance from the ground.

A problem magnifying the limitations in the current step design is the handle next to the door installed by the manufacturers of the motor homes. The handle is designed to allow no more than one hand to grasp it at any one time. Therefore, the handle is small. Because the handle is so small, it must be positioned in a location so people both entering and exiting the motor home can grasp it to balance themselves. This is awkward for people exiting the motor home because they must blindly feel the side wall of the motor home to locate the handle or, in the alternative, extend their upper body out of the motor home to look for the handle which requires a great deal of balance. Also, this is awkward for people attempting to enter the motor home because they must initiate the movement of stepping onto the first step before they are able to grasp the handle. This feat requires a great deal of dexterity, especially among senior citizens.

U.S. Pat. No. 4,720,116, issued to Williams et al. on Jan. 19, 1988, discloses a storable stairway for recreational vehicles. The stairway and platform extend out from a doorway located in the back of the vehicle. A bannister extends out with the stairway because it is attached directly to the stairway. Although this bannister increases the safety of the stairway, it does not extend all the way to the bottom stair resulting stepping up and down the stairway without the aid of a manual support, i.e., support through the use of the hands of the user. In addition, this bannister does not optimize stability because the current design of retractable steps extend only the length of the doorway which necessitates this bannister to extend and retract at an angle. Such an angle would require hinges that allow play or relative movement therebetween resulting in mishaps due to a person's belief that the bannister is sturdy and will not move once it is grasped.

U.S. Pat. No. 4,168,134, issued to Pohl on Sep. 18, 1979, discloses a vehicle doorway lift having radial arms which may also act as retractable bannisters. However, these radial arms cannot be used in conjunction with the current retractable step designs because the steps do not extend out beyond the width of the doorway as does the lift platform, disclosed in the Pohl patent, which is capable of accepting wheelchairs therein.

French patent 1,383,843, issued to Morin, discloses a bannister for use with foldable steps located at the rear of the motor home. The bannisters fold, rotate, and telescope out to their extended position. The bannisters further act an supports to support any load placed on the steps. Again, these bannisters will not work with the retractable steps as currently designed because the bannisters disclosed in the Morin patent necessitate foldable steps that have a width greater than the width of the doorway.

SUMMARY OF THE INVENTION AND ADVANTAGES

A retractable bannister assembly is disclosed for use with a set of retractable steps which are movable between an extended position and a retracted position. The retractable steps are fixedly secured to a vehicular compartment having a side wall. The retractable bannister assembly comprises a plurality of telescoping members, each of which have first and second fixed ends and first and second floating ends and a length extending therebetween. Each of the floating ends are movable along the length of the other of the plurality of telescoping members. First securing means rotatably secures the first fixed and to a side wall of a vehicle compartment. Second securing means rotatably secures the second fixed end to a retractable step. The retractable step defines a horizontal plane and is fixedly secured to the vehicular compartment. The retractable bannister assembly is characterized by offsetting means which disposes the second fixed end a distance from the retractable step such that the plurality of telescoping members rotate and extend through a plane perpendicularly to the horizontal plane of the retractable step.

The advantage associated with the subject invention is it provides a handle which extends total length of the stairway; it automatically extends and retracts with the retractable steps; and it provides a secure bannister which allows only for motion in a single plane.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 3:
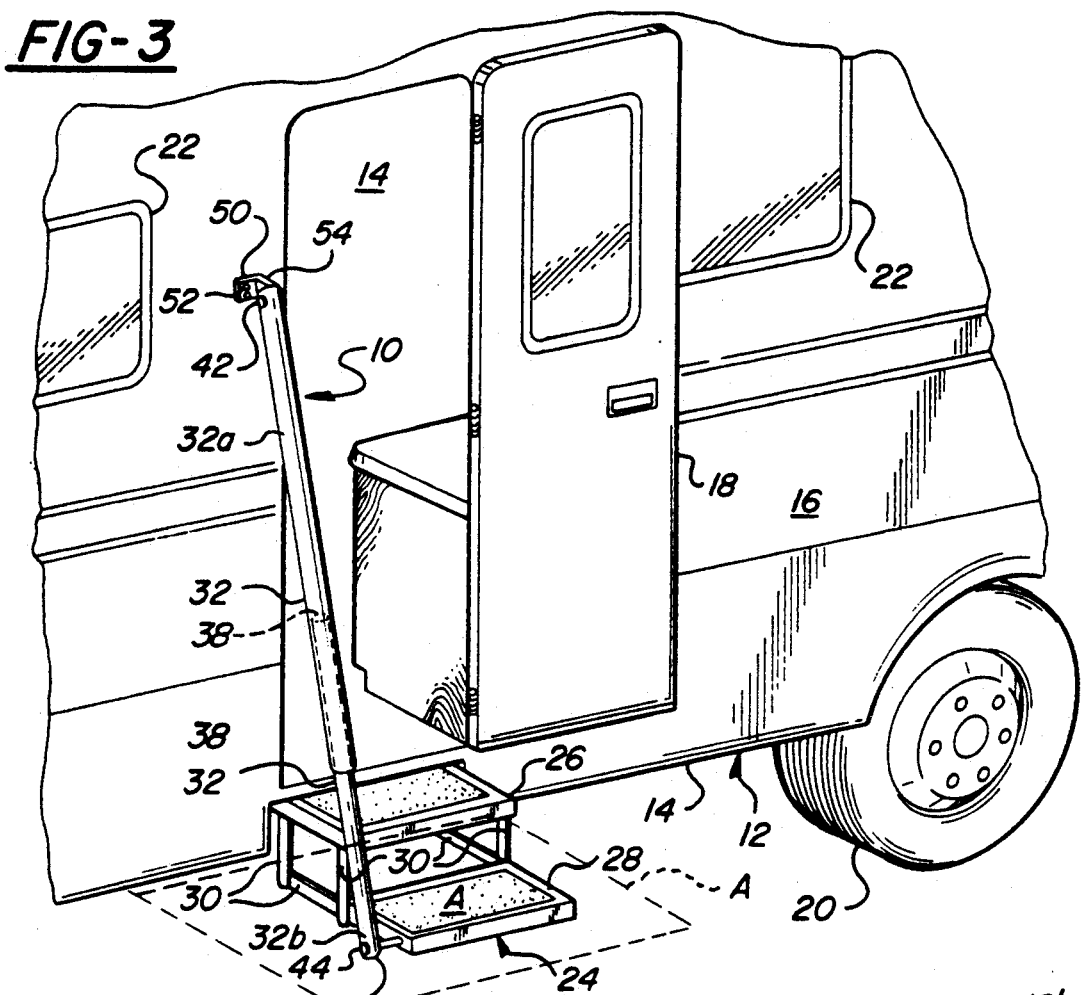
FIG. 3 is a perspective view of the preferred embodiment of the subject invention in the extended position.

Turning to the enclosed sketches, the subject invention is generally shown at 10. The subject invention is a retractable bannister assembly 10 and is designed to be used with recreational vehicles, trailers and the like. For simplicity, the retractable bannister assembly 10 is discussed and shown attached to a motor home, generally indicated at 12 having a passenger compartment 14, at least one side wall 16, a side door 18, a plurality of wheels 20 (one shown in FIGS. 1 and 3), a plurality of windows 22 and a set of retractable steps, generally indicated at 24. However, it would be obvious to one skilled in the art to incorporate the retractable bannister assembly 10 with any structure utilizing retractable steps and, thus, the subject invention 10 is not limited to use with recreational vehicles.

Figure 1:
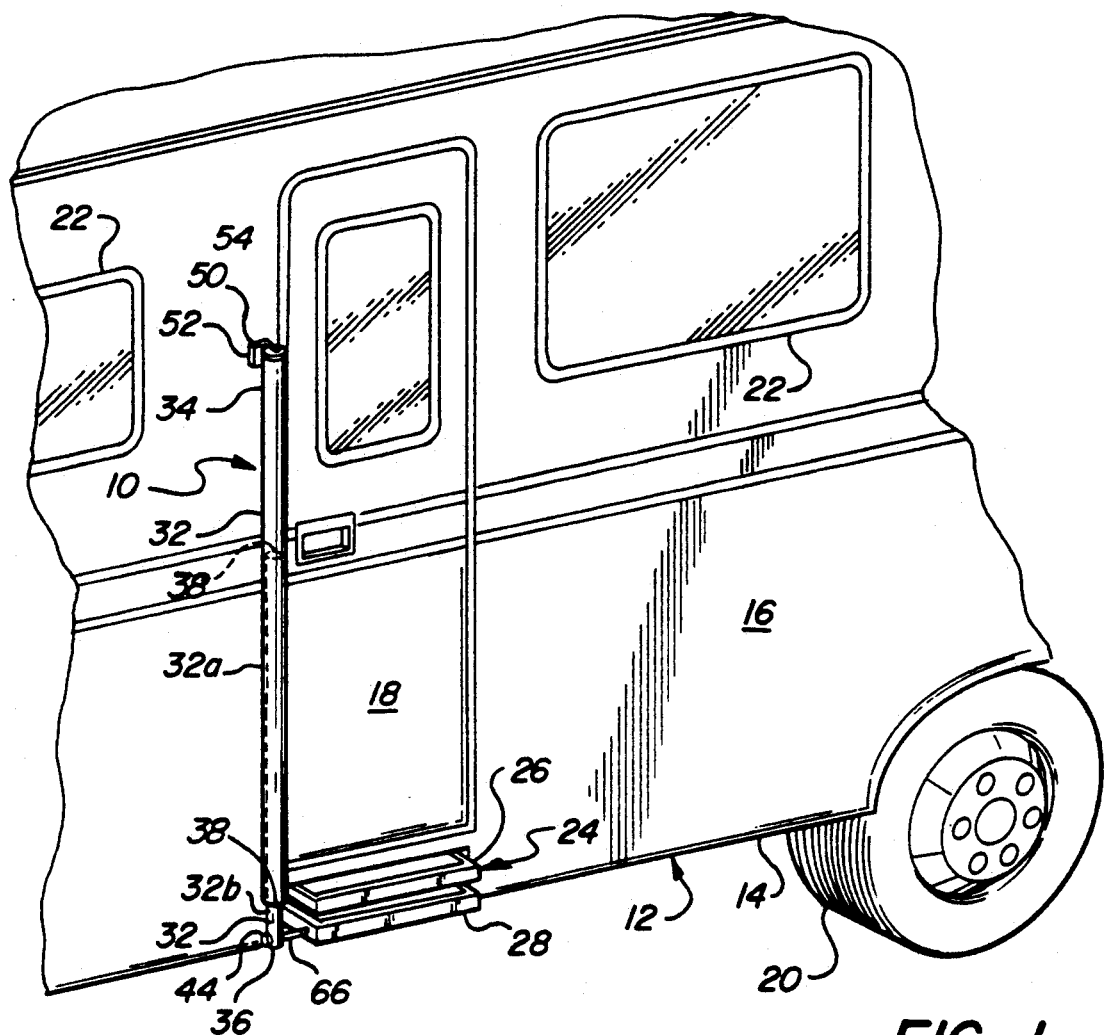
FIG. 1 is a perspective view of the preferred embodiment of the subject invention in its retracted position.
Figure 2:
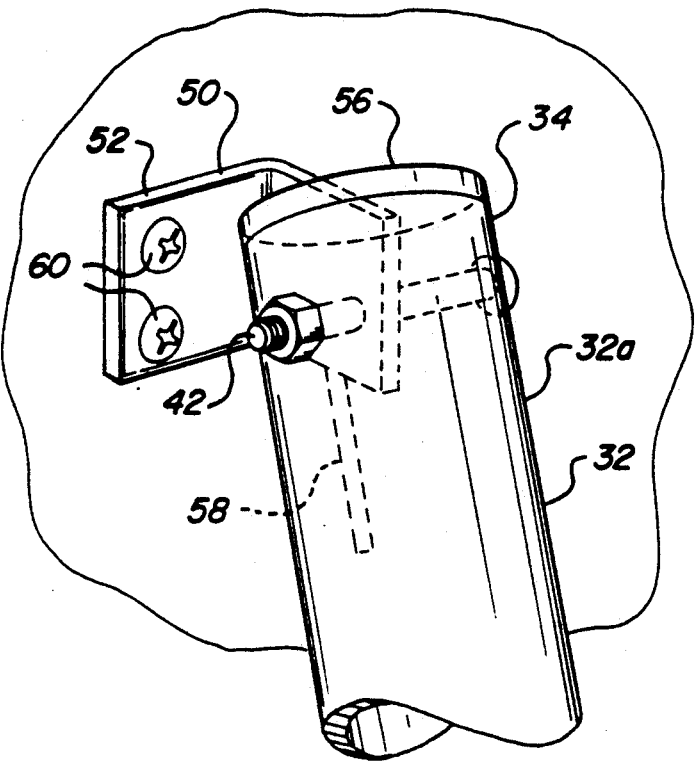
FIG. 2 is a perspective view of the preferred embodiment of the subject invention partially cut away with a fixed end shown in phantom.
Figure 4:
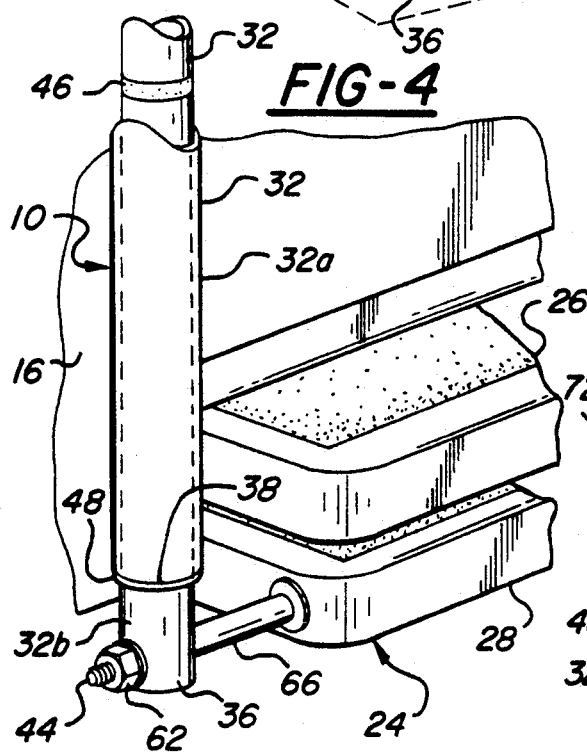
FIG. 4 is a partially cut away perspective view of the preferred embodiment of the subject invention in the retracted position.
Figure 5:
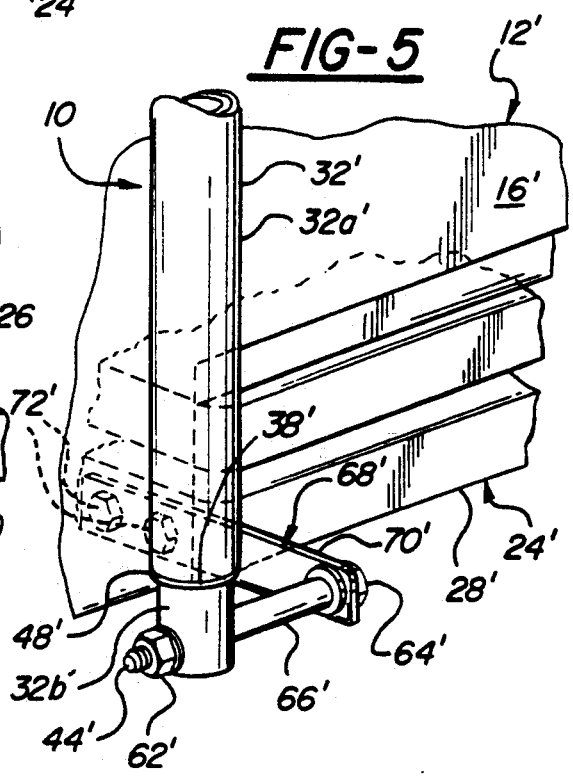
FIG. 5 is a partially cut away perspective view of a second alternative embodiment of the subject invention with the retractable steps shown in phantom.

The retractable bannister assembly 10 is used in conjunction with a set of retractable steps 24 which are movable between an extended position (FIG. 3) and a retracted position (FIGS. 1, 4-5). Although more steps may be used, the set of retractable steps 24 in the Figures include upper 26 and lower 28 steps. The upper 26 and lower 28 steps are connected by linkages 30 which allow the retractable steps 26,28 to move relative to each other and to the motor home 12. The linkage are driven between the two positions by a motor (not shown) which is activated manually or by the opening and closing of the door 18. The set of retractable steps 24 are fixedly secured to a vehicular compartment 14 via the linkages 30. The linkages 30 are designed so the upper 26 and lower 28 retractable steps remain parallel to each other and to a substantially horizontal plane A shown as the face of the lower retractable step 28 when it is in its extended position throughout the movement of the retractable steps 24.

The retractable bannister assembly 10 includes a plurality of telescoping members 32, each of which have first 34 and second 36 fixed ends and first and second floating ends 38, and a length extending therebetween, respectively. The first 34 and second 36 fixed ends are fixed with respect to their respective locations on the side wall 16 and the lower retractable step 28. Each of the two fixed ends 34,36 pivots or rotates about a pin 42,44. The floating ends 38 which are movable along each of said lengths of the other of the plurality of telescoping members 32. More particularly, the floating ends 38 of each of the plurality of telescoping members 32 are not attached or secured to any one structure but move up and down the length of another telescoping member 32 as one of the telescoping members 32 is slid over the other.

The telescoping members 32 are hollow members approximately five feet long allowing sliding between the telescoping members 32. In the preferred embodiment of the subject invention 10, two telescoping members 32 are used wherein the upper telescoping member 32a has an inner diameter slightly greater than the outer diameter of the lower telescoping member 32b so the lower telescoping member 32b may slide inside and with respect to the upper telescoping member 32a. The telescoping members 32 may be fabricated from any structurally sound material. In the preferred embodiment, the upper telescoping member 32a is fabricated of polyvinylchloride, commonly referred to as PVC, and the lower telescoping member 32b is fabricated of aluminum. Any combination of materials used for the telescoping members 32 can be used and it would be obvious to those skilled in the art to use different combinations, i.e., both of the telescoping members 32 being aluminum.

Because the lower telescoping member 32b slides within the upper telescoping member 32a, friction reducing means 46 is used to reduce the friction between the plurality of telescoping members 32. The friction reducing means 46 includes a plurality of strips of tape wrapped around a portion of the plurality of members 32 and, more particularly, the portion of the inner telescoping member 32b which is not seen because it is always inside the outer telescoping member 32a. In the preferred embodiment, the inner telescoping member 32b is the lower telescoping member 32b. The strips of tape 46 are spaced equidistantly from each other along the length of the lower telescoping member 32b. Said another way, the strips of tape 46 are wrapped around the telescoping member 32b housed inside the remaining of the plurality of telescoping members 32, if the design of the retractable bannister 10 includes more than two telescoping members 32.

Additionally, an insert or cap 48 may be inserted into the floating end 38 of the outer or upper telescoping member 32a to maintain the spaced relationship between the two telescoping members 32. The insert 48 can be fabricated from a material, such as polytetrafluoroethylene (commonly referred to as TEFLON TM) or a lubricated plastic material, which will also aid in reducing friction between the plurality of telescoping members 32.

The retractable bannister assembly 10 further includes first securing means, generally shown at 50, for rotatably securing one of said fixed ends 34 to the side wall 16 of a vehicular compartment 12. The first securing means 50 includes an L-shaped bracket 50 having a back 52 and one side wall 54. The side wall 54 extends out from the back 52 parallel to the vertical plane in which the plurality of telescoping members 32 move. The first fixed end 34 further includes a slot 58 which receives the first fixed end 34 therein to be symmetrically mounted on the side wall 54. The slot 58 is of a length necessary to allow lost rotational motion between the first fixed end 34 and the first securing means 50. Two bolts 60 secure the L-shaped bracket 50 to the side wall 16.

An alternative embodiment of the subject invention 10 includes a first securing means having a U-shaped bracket having a back and two side walls. The two side walls extend out from each side of the back wall parallel the vertical plane in which the plurality of telescoping members. The alternative embodiment of the first securing means includes a top plate which extends between the back and side walls. The top plate also includes a lip which extends down over a portion of the two side walls.

The pin 42 extends through the side wall 54 and the first fixed end 34 of the top telescoping member 32a. The pin 42 rotatably secures the upper telescoping member 32a to the first securing means 50.

A cap 56 is secured to the first fixed end 34 by the pin 42. Although it is not shown, the cap 56 includes a cylindrical portion which extends down into the first fixed end 34. Likewise, the cylindrical portion of the cap 56 can also extend down over the first fixed end 34. The cap 56 is secured to the first fixed end 34 via the pin 42. The cap 56 further includes a slot (not shown) which allows for lost rotational motion between the first securing means 50 and the cap 56.

Second securing means 44 rotatably secures the second fixed end 36 to a retractable step 28. The second securing means 44 is the pin 44. At least two nuts 62, 64 (the second nut 64 may be seen in FIG. 5) threadably engage the pin 44 at either end of the pin 44. The second nut 64 is secured to the pin 44 under the retractable step 28 whereas the first nut 62 is secured to the end of the pin 44 adjacent the lower telescoping member 32b.

The retractable bannister assembly 10 is characterized by offsetting means which disposes the second fixed end 36 a distance from the retractable step 28 such that the plurality of telescoping members 32 rotate and extend through a plane perpendicularly to the horizontal plane A of the retractable step 28. More specifically, the telescoping members 32 remain in the same plane which is perpendicular to the horizontal plane A and the sidewall 16 throughout its movement. The offsetting means 66 includes a sleeve 66 surrounding a portion of the second securing means 44 between the retractable step 28 and the second fixed end 36. The sleeve 66 maintains the telescoping members 32 in a single plane eliminating any play or slop in the fixtures, i.e., the first 50 and second 44 securing means. In the alternative embodiment discussed above, the the sleeve 66 would be longer because the U-shaped bracket, having the first fixed end 34 secured between the two side walls, would not be able to be secured close enough to the door to provide a bannister which moves in a single plane perpendicular to the horizontal plane A. More specifically, the sleeve 66 would be greater in length because the first fixed end 34 of the upper telescoping member 32a would be located a greater distance from the door 18 because the first fixed end 34 would be secured to the U-shaped bracket between the two side walls, as opposed to straddling the single side wall 54 of the L-shaped bracket 50.

In a second alternative embodiment, as shown in FIG. 5, wherein like primed numerals represent similar structure in the preferred embodiment, the offsetting means 66' further includes extending means, generally indicated at 68'. The extending means 68' extends the second fixed end 36 of the lower telescoping member 32b out and away from the lower retractable step 28'. The extending means 68' includes an elongated member 70' fixedly secured to the lower retractable step 28' using two bolts 72'. The extending means 68' is used in conjunction with sets of retractable steps 24' which, as is shown in FIG. 5, retract fully underneath the side wall 16' of the motor home 12'. The elongated member 70' may include structural supports (not shown) which will strengthen the support features of the retractable bannister assembly 10' such as bends or ripples in the material used to fabricate the elongated member 70'. The retractable bannister assembly 10' continues to move in a plane perpendicular to the horizontal plane A.

The method for extending the retractable bannister 10 out from a vehicular compartment 10 comprises the steps of securing one end 34 of the retractable bannister assembly 10 to a side wall 16 of a vehicular compartment 12 and aligning the retractable bannister assembly 10 to extend in a plane perpendicular to a horizontal plane A created by one of the retractable steps. The method is characterized by securing the second end 36 of the retractable bannister assembly 10 to one step 28 of the set of retractable steps 24 such that the retractable bannister assembly 10 maintains perpendicular alignment with the horizontal plane A.

The method is further characterized by extending and retracting the retractable bannister assembly 10 by extending and retracting the set of retractable steps 24. More specifically, the retractable bannister assembly 10 is a slave to the retractable steps 24, the master in this relationship, and, therefore, moves between its extended and retracted positions as the retractable steps 24 extend between its extended and retracted positions.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

I claim:

1. A retractable bannister assembly (10) for use with a set of retractable steps (24) moveable between an extended position and a retracted position and fixedly secured to a vehicular compartment (12) having a side wall (16) and a door (18), said retractable bannister assembly (10) comprising:

a plurality of telescoping members (32), each of said plurality of telescoping members (32) having first (34) and second (36) fixed ends and first and second floating ends (38) and a length extending therebetween, each of said first (38) and second floating ends being movable along said length of the other of said plurality of telescoping members (32);

first securing means (50) for pivotally securing said first fixed end (34) to a side wall (16) of a vehicular compartment (12);

second securing means (44) for pivotally securing said second fixed end (36) to a retractable step (28) having at least one side, the retractable step (28) defining a horizontal plane (A) and being secured to the vehicular compartment (12), said retractable bannister assembly (10) characterized by offsetting means (66) located between said second fixed end (36) and the side of the retractable step (28) for disposing said second fixed end (36) a distance from the retractable step (28) such that said plurality of telescoping members (32) pivot and extend through a plane spaced apart from the side of the retractable step (28) and perpendicular to the horizontal plane (A) of the retractable step (28).

2. An assembly (10) as set forth in claim 1 further characterized by said offsetting means (58, 66) including a sleeve (66) surrounding a portion of said second securing means (44) between said second fixed end (36) and the side of the retractable step (28).

3. An assembly (10') as set forth in claim 2 further characterized by said offsetting means (66') further including extending means (68') for extending said second fixed end (36') out from the retractable step (28') within the horizontal plane (A).

4. An assembly (10) as set forth in either of claims 2 or 3 further characterized by friction reducing means (46) for reducing the friction between said plurality of telescoping members (32).

5. An assembly (10) as set forth in claim 4 further characterized by said friction reducing means (46) including a plurality of strips of tape wrapped around a portion of said plurality of telescoping members (32), said strips of tape (46) being spaced equidistantly from each other along said lengths of said plurality of telescoping members (32) housed inside the remaining of said plurality of telescoping members (32).

6. An assembly (10) as set forth in claim 5 further characterized by said first securing means (50) including an L-shaped bracket having a back (52) and at least one side wall (54), said side wall (54) extending out from said back wall (52).

7. An assembly (10) as set forth in claim 6 further characterized by a slot 58 cut through said first fixed end (14) for receiving said side wall (54) therein to dispose said first fixed end (34) adjacent a door (18) of the vehicular compartment (12).

8. An assembly (10) as set forth in claim 7 further characterized by a pin (42) extending through said side wall (54) and said first fixed end (34) of one of said plurality of telescoping members (32) for pivotally securing one (32a) of said plurality of telescoping members (32) to said first securing means (50).

9. An assembly (10) as set forth in claim 8 further characterized by said second securing means (44) including a threaded rod (44) and a nut (62) at either end of said threaded rod (44).

* * * * *